United States Patent [19]

O'Neil

[11] 4,377,972

[45] Mar. 29, 1983

[54] METHOD AND APPARATUS FOR OPERATING MATRIX PRINTER

[75] Inventor: John M. O'Neil, Hamden, Conn.

[73] Assignee: Bristol Babcock Inc., Waterbury, Conn.

[21] Appl. No.: 250,861

[22] Filed: Apr. 3, 1981

[51] Int. Cl.³ .............................................. B41J 3/12
[52] U.S. Cl. ............................. 101/93.04; 346/76 PH; 400/120
[58] Field of Search ....................... 400/120, 121, 124; 101/93.04, 93.05; 346/76 PH

[56] References Cited

U.S. PATENT DOCUMENTS

| | | | |
|---|---|---|---|
| 3,984,844 | 10/1976 | Tanno et al. | 346/76 PH |
| 4,020,465 | 4/1977 | Cochran et al. | 346/76 PH X |
| 4,140,404 | 2/1979 | Kaenel | 400/120 |
| 4,149,171 | 4/1979 | Sato et al. | 400/120 X |

Primary Examiner—Paul T. Sewell
Attorney, Agent, or Firm—Pennie & Edmonds

[57] ABSTRACT

A method and apparatus are described for improving the printing speed of a dot matrix printer. The printer comprises a conventional array of printing elements and a printing element addressing matrix comprising a set of address lines and a set of strobe lines. Each printing element is connected in series between one of the address lines and one of the strobe lines. Each address line is connected to the output of a first register, and each strobe line to the output of a second register. The printer further comprises apparatus for generating a set of signals representative of a dot matrix pattern to be made on said recording medium, said set of signals being organized in successive sequences each of which contains the signals which control the application of a voltage to the address lines connected to the same printing elements as one of the strobe lines; apparatus for applying the signals of each sequence in turn to the inputs to the first registers in one or more parallel operations, and apparatus for reading the signals of each sequence from the first registers in one or more parallel operations while a voltage is applied to one of the strobe lines from the second register.

5 Claims, 4 Drawing Figures

METHOD AND APPARATUS FOR OPERATING MATRIX PRINTER

CROSS REFERENCES RELATED TO APPLICATIONS

Related applications which are incorporated herein by reference, are "Intelligent Keyboard/Display", Ser. No. 227,969 and "Single Loop Control System", Ser. No. 227,970 filed Jan. 23, 1981 and assigned to Bristol Babcock, Inc.

BACKGROUND OF THE INVENTION

This relates to a computer output printer of the dot matrix type and in particular to a method and apparatus for accessing the individual printing elements in a printhead matrix.

In one type of dot matrix printer a line of closely spaced printing elements extends across the surface of a recording medium. In order to print alphanumeric characters of reasonably good visual quality, the printing elements may be arranged in a density of as many as 100 per linear inch. Typically, these printing elements are individually addressed by a printhead control that includes two sets of electrically conductive leads with one lead from each set being connected in series to each printing element but each such pair of leads being different. To print a dot on a recording medium such as thermal paper, the printhead control applies a voltage source to one of the two leads while the other lead is grounded. A current flow for about two to five milliseconds is sufficient with presently available printing elements to heat the region of the thermal paper adjacent the printing element enough to form a dot thereon.

While such writing speeds appear relatively fast, a large number of dots are required to make up a character. Typically 5×7 and 7×9 dot matrices are used and there can be 400 or more printing elements across a four inch wide strip of paper. Efforts to increase printing speeds, moreover, are complicated by the wiring patterns used to access the printing elements. Such patterns appear to be designed to minimize lead lengths and interconnections so as to reduce resistive losses and faults. Little attention appears to have been given to organizing the printhead control for maximum print speed.

SUMMARY OF INVENTION

I have devised a method and apparatus for improving the printing speed of a dot matrix printer. The printer comprises a conventional array of printing elements and a printing element addressing matrix comprising a set of address lines and a set of strobe lines. Each printing element is connected in series between one of said address lines and one of said strobe lines; and the same strobe line is connected to several printing elements. The printer further comprises a control means for establishing a flow of electric current selectively in the address line and strobe line connected to each printing element sufficient to produce a sensible indication on a recording medium adjacent the printing element. In one prior art printer, this control means comprises an array of first registers in which each register has at least one input line and a plurality of output lines, with each output line controlling a voltage applied to one address line and a second register which has at least one input line and a plurality of output lines, with each output line controlling the voltage applied to one of said strobe lines. In accordance with my invention, the printer further comprises means for generating a set of signals representative of a dot matrix pattern to be made on said recording medium, said set of signals being organized in successive sequences each of which contains the signals which control the application of a voltage to the address lines connected to the same printing elements as one of the strobe lines; means for applying the signals of each such sequence in turn to the inputs to said first registers in one or more parallel operations; and means for reading the signals of each said sequence from said first registers in one or more parallel operations while a voltage is applied to one of said strobe lines from said second register. Illustratively, the first and second registers are implemented in the form of latch/drivers.

BRIEF DESCRIPTION OF THE DRAWING

These and other objects, features and advantages of my invention will be more readily apparent from the following detailed description of the best mode for carrying out the invention in which.

BEST MODE FOR CARRYING OUT THE INVENTION

Figure 1:
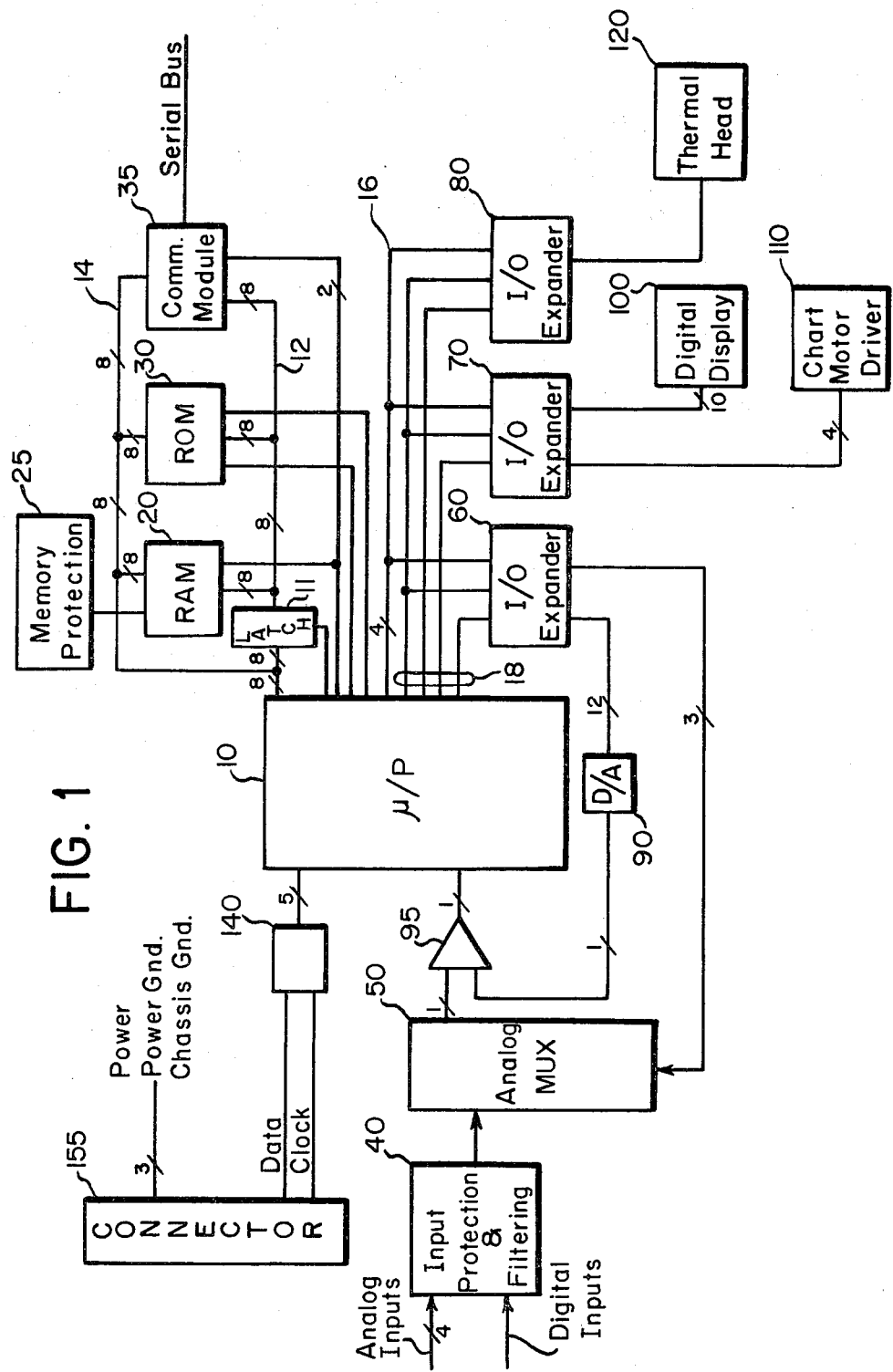
FIG. 1 is a block diagram of an illustrative embodiment of a recorder in which the present invention is used.

FIG. 1 is a block diagram of an illustrative embodiment of a recorder in which the present invention is used. The recorder comprises a microprocessor 10, a latch 11, a random access memory (RAM) 20, a memory protection circuit 25, a read only memory (ROM) 30, a serial communication module 35, an input protection and filtering circuit 40, an analog multiplexer 50, I/O expanders 60, 70, 80, a digital-to-analog converter 90, a comparator 95, a digital display 100, a chart motor driver 110, a thermal printer 120, a communications multiplexer 140 and a connector 155.

Microprocessor 10 illustratively is an Intel 8039/8049 microprocessor. Latch 11 is a 373-type octal D-type flip-flop which controls an address bus 12 in response to a signal from microprocessor 10. Address bus 12 provides eight bits of address to RAM 20, ROM 30 and the communication module. Data from these units is returned to microprocessor 10 on an eight bit parallel data bus 14. RAM 20 is a pair of 5101-type 256×4 bit CMOS memory chips connected together to provide 256 bytes of random access storage. Two control lines from microprocessor 10 control the operation of writing into and reading from these chips. RAM 20 is used for both temporary storage of data that is to be printed by the recorder and configuration data. The stored data is protected against power failure by a long-life battery in memory protection circuit 25. ROM 30 is three units of 2K×8 bit memory such as a 2716-type read only memory. Each ROM unit is addressed by the eight address lines of bus 12 and three additional address lines. Two additional lines plus control logic (not shown) select the individual ROM chip. The operating program for the recorder is stored in ROM 30.

There are up to four analog and three digital inputs to the recorder. Protection against voltage excursions and high-frequency transients is provided by input protection and filtering circuit 40. The filtered analog and digital signals are applied to analog multiplexer 50. Multiplexer 50 illustratively is a 4051-type one-out-of-eight multiplexer whose output is selected by three of the lines from I/O expander 60. The analog output of multiplexer 50 is converted to a digital signal by means of twelve bit digital-to-analog converter 90, comparator 95 and a standard analog-to-digital programming routine which is executed by microprocessor 10. Digital signals may also be supplied to the recorder by the communication module which illustratively is the same as module 16 described in the above-referenced "Single Loop Control System".

I/O expanders 60, 70, 80 are connected to microprocessor 10 via data bus 16 and select lines 18. I/O expander 70 provides for signal outputs to digital display 100 and chart motor driver 110. I/O expander 80 provides for signal outputs to thermal printing head 120. Each expander illustratively is an 8243-type expander which has four 4-bit wide input/output ports. When one of select lines 18 is low, the four lines of data bus 16 may be used to configure the expander for operations such as read or write and to select one of the four output ports for input/output operations. When the same select line 18 goes high the four lines of data bus 16 are connected to the four lines of the input/output port selected when the select line was low. Alternatively, the four lines of bus 16 may be connected in parallel to a bidirectional buffer register which is also connected in parallel to the four lines of the input/output port.

Communication multiplexer 140 is a 75138-type multiplexer which is used to multiplex incoming and outgoing clock and data signals. Connector 155 mates with connector 155 of the intelligent keyboard/display described in the above-referenced "Intelligent Keyboard/Display" and provides for the transmission of clock and data signals to and from the intelligent keyboard/display.

Figure 2:
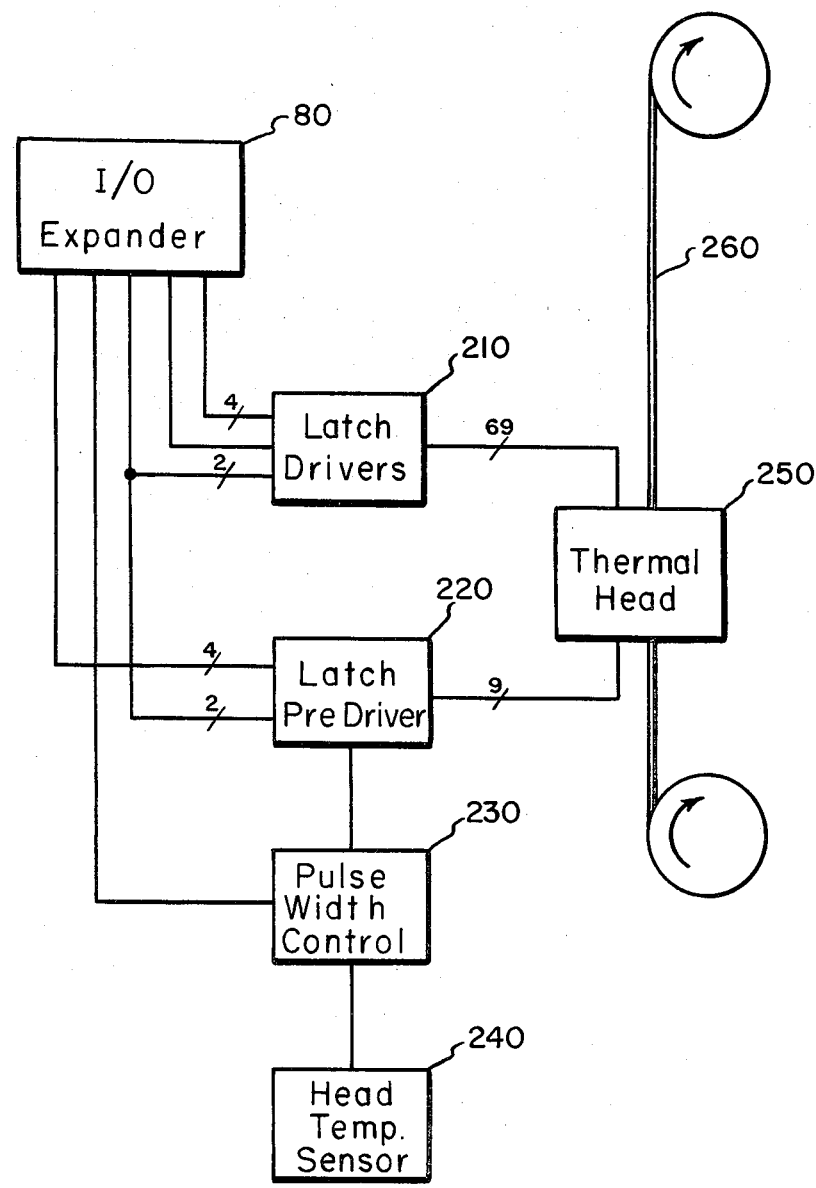
FIG. 2 is a block diagram of an illustrative embodiment of a dot matrix printer in accordance with the present invention.
Figure 3:
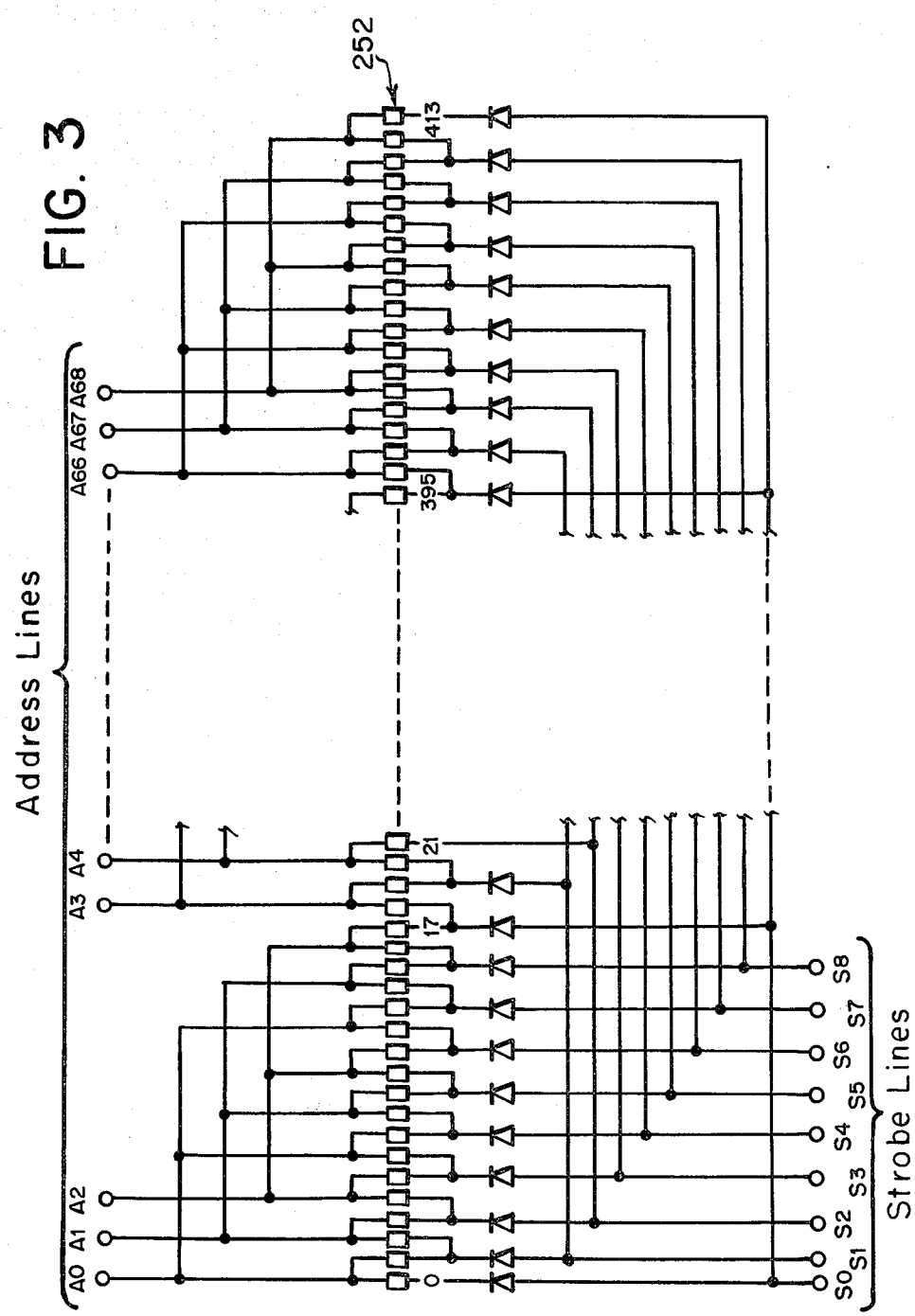
FIGS. 3 and 4 are schematic illustrations of details of FIG. 2.
Figure 4:
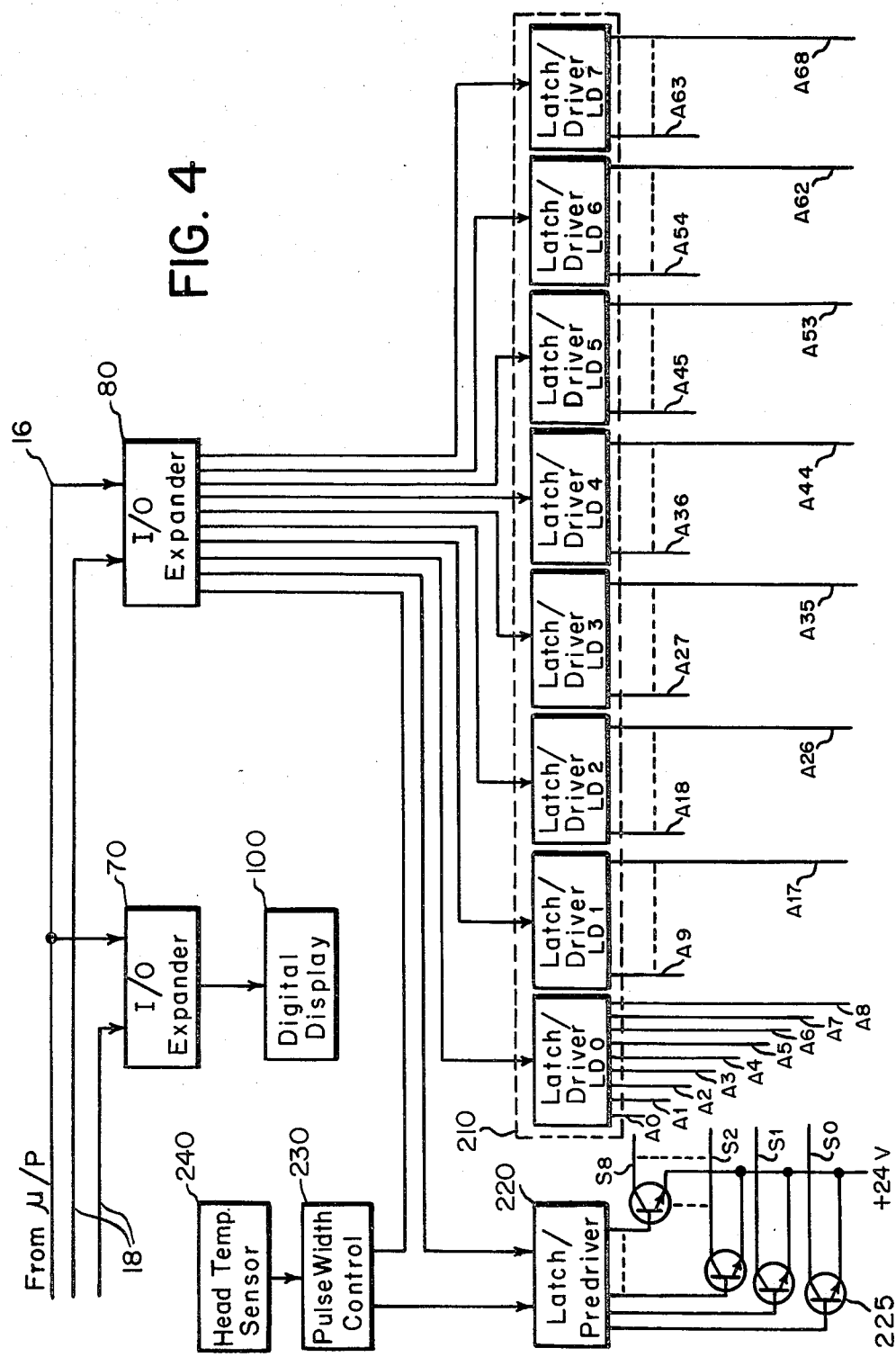

The thermal printer is depicted in greater detail in FIG. 2. As shown therein, the printer comprises a set of first registers identified as latch/drivers 210, a second register identified as latch/predriver 220, a pulse width control 230, a thermal head temperature sensor 240 and a thermal printing head 250. Thermal printing head 250 illustratively is a commercial device such as the DM 69414 printing head manufactured by Gulton Industries, Inc. of Metuchen, N.J. As shown in FIG. 3, this printing head contains a single continuous row of printing elements 252 spaced so as to print one hundred dots per inch on a strip that is slightly more than four inches wide. The printing head uses a total of sixty-nine address lines A0-A68 and nine strobe lines S0-S8 to deliver to 414 individual printing elements sufficient current to print visible indicia on a recording medium 260, such as a thermal paper. As shown in FIG. 4, latch/drivers 210 consist of an array of eight 9-bit wide serial input latches and parallel output drivers LD0-LD7 suitable for driving the sixty-nine address lines. Latch/predriver 220 is a 9-bit wide serial input latch and parallel output predriver. The nine output lines from predriver 220 control nine transistor drivers 225 which drive the strobe lines S0-S8. Illustratively, each 9-bit wide latch/driver and latch/predriver may be implemented in a UCN-4810A chip.

Advantageously the intensity or gray scale of the print may be controlled by means of thermal head temperature sensor 240 and pulse width control 230. The intensity of the printed indicia will decrease with decreasing ambient temperature of the thermal head. To compensate for this, sensor 240 senses the temperature of the head and pulse width control 230 adjusts the length of the electrical pulse used for printing.

To read data from or enter data into the recorder, an intelligent keyboard/display is plugged into the recorder through connector 155. The keyboard/display will then determine that it has been connected to a recorder and will display RECORDR on its display. At the same time the keyboard/display selects the recorder operating program which defines the functions of the keys.

One particular application to which the combination of keyboard/display and recorder may be put is the hard copy printout of data stored in random access memory (RAM) of the keyboard/display. Data may be stored in the keyboard/display RAM from any instrument to which the keyboard/display is connected. The data may then be read from the keyboard display into RAM 20 of the recorder. In accordance with programming routines stored in ROM 30 of the recorder, the contents of RAM 20 may then be printed by thermal printing head 250 on an appropriate recording medium 260. Advantageously, the keys of the keyboard/display can also be configured as an alphanumeric keyboard for entry of text onto the hard copy output of the recorder.

In known prior art printers, the signals which control the address lines to the printing elements are typically generated in some type of computer and are read out of the computer one bit at a time. In accordance with my invention, the signals which control the address lines are first rearranged by microprocessor 10 so that they can be read out in parallel, are read into the array of latch/drivers LD0-LD7 in parallel, and are used in parallel to control the voltage signals applied to groups of address lines A0-A68.

The initial processing of the information to be printed is conventional. An internal array of 8×52 bits of random access memory is allocated to the storage of logic signals which indicate which printing elements are to print a dot on the recording medium. The specific printing element controlled by each bit of the internal array is indicated in the listing for the internal array set forth in the comments to the computer program attached hereto as Appendix A. To facilitate processing, the individual printing elements are identified in the listing of the internal array by a number that is seven less than the number of the printing element shown in FIG. 3.

For graphic output, trace values and grid markings must be printed. Trace values are supplied to the microprocessor in the form of a value between 0 and 1. These values are multiplied by 400 to identify the particular printing element which will be used to print the value. Grid markings for the display scale are likewise determined. With respect to alphanumeric text, each character is printed as a 5×7 or 7×9 matrix of dots. A pointer is used to identify the particular row of the matrix that is being assembled for printing. The text to be printed is assembled in a register. The microprocessor reads this text one character at a time and determines from a look-up table the dot pattern to be printed for each character for the row of the matrix identified by the pointer. As a result, a sequence of 414 bits is generated representing the pattern to be printed across one line. This sequence is stored in the 8×52 bit internal array.

In the known prior art, this sequence is read out one bit at a time into an array of address line registers. In accordance with my invention, however, the internal array is first transformed by the computer into an output which permits parallel operation of the computer read out and subsequent operations. An illustrative computer program for performing such a transformation is set forth in Appendix A. The output array is partially enumerated in the comments at the beginning of the program and is fully set forth in Table I. As is apparent, Table I is organized into nine segments, corresponding to the nine strobe lines, and each segment into six rows of eight bits (or one byte) each. The bits in each of the eight columns are written into a different one of latch/drivers LD0–LD7.

The program is organized in three nested loops. The first, set forth at address lines 0993 through 09A6, constructs one byte of the output array from the internal array and a knowledge of the printing element to be addressed by the first bit of the byte. As will be apparent, the eight bits of each byte control every fifty-fourth printing element. The second loop, set forth at address lines 09B5 through 09D6, calculates which printing element is to be addressed by the first bit of each byte.

TABLE I

| Strobe Line | LD0 | LD1 | LD2 | LD3 | LD4 | LD5 | LD6 | LD7 |
|---|---|---|---|---|---|---|---|---|
| S0 | 0 | 54 | 108 | 162 | 216 | 270 | 324 | 378 |
|  | 17 | 71 | 125 | 179 | 233 | 287 | 341 | 395 |
|  | 18 | 72 | 126 | 180 | 234 | 288 | 342 | 396 |
|  | 35 | 89 | 143 | 197 | 251 | 305 | 359 | 413 |
|  | 36 | 90 | 144 | 198 | 252 | 306 | 360 | x |
|  | 53 | 107 | 161 | 215 | 269 | 323 | 377 | x |
| S1 | 1 | 55 | 109 | 163 | 217 | 271 | 325 | 379 |
|  | 2 | 56 | 110 | 164 | 218 | 273 | 326 | 380 |
|  | 19 | 73 | 127 | 181 | 235 | 289 | 343 | 397 |
|  | 20 | 74 | 128 | 182 | 236 | 290 | 344 | 398 |
|  | 37 | 91 | 145 | 199 | 253 | 307 | 361 | x |
|  | 38 | 92 | 146 | 200 | 254 | 308 | 362 | x |
| S2 | 3 | 57 | 111 | 165 | 219 | 273 | 327 | 381 |
|  | 4 | 58 | 112 | 166 | 220 | 274 | 328 | 382 |
|  | 21 | 75 | 129 | 183 | 237 | 291 | 345 | 399 |
|  | 22 | 76 | 130 | 184 | 238 | 292 | 346 | 400 |
|  | 39 | 93 | 147 | 201 | 255 | 309 | 363 | x |
|  | 40 | 94 | 148 | 202 | 256 | 310 | 364 | x |
| S3 | 6 | 60 | 114 | 168 | 222 | 276 | 330 | 384 |
|  | 5 | 59 | 113 | 167 | 221 | 275 | 329 | 383 |
|  | 24 | 78 | 132 | 186 | 240 | 294 | 348 | 402 |
|  | 23 | 77 | 131 | 185 | 239 | 293 | 347 | 401 |
|  | 42 | 96 | 150 | 204 | 258 | 312 | 366 | x |
|  | 41 | 95 | 149 | 203 | 257 | 311 | 365 | x |
| S4 | 7 | 61 | 115 | 169 | 223 | 277 | 331 | 385 |
|  | 8 | 62 | 116 | 170 | 224 | 278 | 332 | 386 |
|  | 25 | 79 | 133 | 187 | 241 | 295 | 349 | 403 |
|  | 26 | 80 | 134 | 188 | 242 | 296 | 350 | 404 |
|  | 43 | 97 | 151 | 205 | 259 | 313 | 367 | x |
|  | 44 | 98 | 152 | 206 | 260 | 314 | 368 | x |
| S5 | 9 | 63 | 117 | 171 | 225 | 279 | 333 | 387 |
|  | 10 | 64 | 118 | 172 | 226 | 280 | 334 | 388 |
|  | 27 | 81 | 135 | 189 | 243 | 297 | 351 | 405 |
|  | 28 | 82 | 136 | 190 | 244 | 298 | 352 | 406 |
|  | 45 | 99 | 153 | 207 | 261 | 315 | 369 | x |
|  | 46 | 100 | 154 | 208 | 262 | 316 | 370 | x |
| S6 | 12 | 66 | 120 | 174 | 228 | 282 | 336 | 390 |
|  | 11 | 65 | 119 | 173 | 227 | 281 | 335 | 389 |
|  | 30 | 84 | 138 | 192 | 246 | 300 | 354 | 408 |
|  | 29 | 83 | 137 | 191 | 245 | 299 | 353 | 407 |
|  | 48 | 102 | 156 | 210 | 264 | 318 | 372 | x |
|  | 47 | 101 | 155 | 209 | 263 | 317 | 371 | x |
| S7 | 13 | 67 | 121 | 175 | 229 | 283 | 337 | 391 |
|  | 14 | 68 | 122 | 176 | 230 | 284 | 338 | 392 |
|  | 31 | 85 | 139 | 193 | 247 | 301 | 355 | 409 |
|  | 32 | 86 | 140 | 194 | 248 | 302 | 356 | 410 |
|  | 49 | 103 | 157 | 211 | 265 | 319 | 373 | x |
|  | 50 | 104 | 158 | 212 | 266 | 320 | 374 | x |
| S8 | 15 | 69 | 123 | 177 | 231 | 285 | 339 | 393 |
|  | 16 | 70 | 124 | 178 | 232 | 286 | 340 | 394 |
|  | 33 | 87 | 141 | 195 | 249 | 303 | 357 | 411 |
|  | 34 | 88 | 142 | 196 | 250 | 304 | 358 | 412 |
|  | 51 | 105 | 159 | 213 | 267 | 321 | 375 | x |
|  | 52 | 106 | 160 | 214 | 268 | 322 | 376 | x |

The last loop determines which segment is being assembled and when the transformation is completed.

Once a transformation is done, the output array is then read out four bits at a time on data bus 16 into I/O expander 80. Read out commences with the bottom row of the six rows associated with strobe line S0. The first four bits in a row are stored in a buffer register in the expander while the second four bits are read out of the array. The eight bits so available at the expander are then written in parallel one bit to each one of the eight latch/drivers LD0–LD7. The next five rows are written in like fashion from the bottom row to the top so as to assemble 6 bits in each latch. In the course of such writing, a set of zero bits is written between the first and second rows that are written, between the third and fourth rows and between the fifth and sixth rows because no printing is being done by the printing elements attached to the address lines connected to the second, fifth and eighth output lines of each of the latches. At the same time, a circulating bit in latch/predriver 220 is clocked to the position which applies a voltage to strobe line S0. When latch/drivers 210 are fully loaded, a voltage is applied to strobe line S0 and one half of the latch/drivers 210 are read, causing the printing elements to which they are connected to print dots on the recording medium in accordance with the bit pattern stored in latch/drivers 210. Then, the other half of the latch/drivers are read with similar effects.

Latch/predriver 220 is then clocked by one pulse to advance the control bit to the position which controls strobe line S1 and a new segment of bits is written in similar fashion into latch/drivers 210. As in the case of the control signals associated with strobe line S0, six rows of control signals are written into latch/drivers LD0–LD7 for each of the other strobe lines and three sets of zero bits are written so that certain address lines will not be activated. For strobe lines S1, S4 and S7, sets of zero bits are written into latch/drivers LD0–LD7 before the first row of the output array is written and between the second and third rows and between the fourth and fifth rows. For strobe lines S2, S5 and S8, sets of zero bits are written between the second and third rows and between the fourth and fifth rows as well as after the sixth row of the output array. For strobe lines S3 and S6, sets of zero bits are written between the first and second rows, the third and fourth rows and the fifth and sixth rows as in the case of the S0 strobe line.

From the foregoing description and the attached computer program, numerous modifications to my invention will be apparent.

What is claimed is:

1. A dot matrix printer comprising:
   an array of printing elements;
   a printing element addressing matrix comprising a set of address lines and a set of strobe lines, one of said address lines and one of said strobe lines being connected in series to each of said printing elements, a plurality of address lines being connected to the printing elements to which the same strobe line is connected; and means for establishing a flow of electric current selectively in the address line and strobe line connected to each printing element whereby sufficient current flows for the printing element to make a sensible indication on a recording medium adjacent said printing element, said establishing means comprising:

an array of first serial-input, parallel-output registers each register having at least one serial input line and a plurality of output lines, each output line controlling a voltage applied to one address line, a second register having at least one input line and a plurality of output lines, each output line controlling the voltage applied to one of said strobe lines, means for generating a set of signals representative of a dot matrix pattern to be made on said recording medium, said set of signals being organized in successive sequences each of which contains the signals which control the application of a voltage to the address lines connected to the same printing elements as one of the strobe lines, means for applying the signals of each said sequence in turn to the serial inputs to said first registers in one or more parallel operations, and means for reading the signals of each said sequence out of said first registers in one or more parallel operations while a voltage is applied to one of said strobe lines from said second register.

2. In a dot matrix printer comprising:

an array of printing elements;

a printing element addressing matrix comprising a set of address lines and a set of strobe lines, one of said address lines and one of said strobe lines being connected in series to each of said printing elements, a plurality of address lines being connected to the printing elements to which the same strobe line is connected; and means for establishing a flow of electric current selectively in the address line and strobe line connected to each printing element whereby sufficient current flows for the printing element to make a sensible indication on a recording medium adjacent said printing element, said establishing means comprising:

an array of first serial-input, parallel-output registers each register having at least one serial input line and a plurality of output lines, each output line controlling a voltage applied to one address line, and means for controlling the voltage applied to said strobe lines, a method of operating such printer comprising the steps of:

generating a set of signals representative of a dot matrix pattern to be made on such recording medium, said set of signals being organized in successive sequences each of which contains the signals which control the application of a voltage to the address lines connected to the same printing elements as one of the strobe lines, applying the signals of each said sequence in turn to the serial inputs to said first registers in one or more parallel operations, and reading the signals of each said sequence out of said first registers in one or more parallel operations while a voltage is applied to one of said strobe lines.

3. The method of claim 2 wherein the step of generating a set of signals organized in sequences comprises the steps of:

preparing a first set of signals representative of a dot matrix pattern to be made on said recording medium, said set of signals being ordered in the same order as individual dots would appear across the recording medium;

transforming said first set of signals into a second set of signals ordered so that a plurality of said signals may be read in parallel into different ones of said first registers from which they are used in conjunction with a signal on one of the strobe lines to cause selected printing elements to make a sensible indication on said recording medium.

4. The method of claim 3 wherein each of said first registers has a serial input and a parallel output and the signals in said second set of signals are ordered in sequences of rows with each row having as many signals as there are first registers, said step of applying signals to the inputs of said first register comprising the steps of shifting the signals from each row into the first registers in parallel and serially shifting the signals from successive rows in a sequence into said first registers in succession.

5. The method of claim 4 wherein a complete row of sensible indications are made on the recording medium by performing the steps of claim 4 for each of the sequences of the second set of signals with each sequence being read out of said first registers and applied to address lines to said printing elements while a voltage is applied to a different one of said strobe lines.

* * * * *